United States Patent
Shen

(12) 
(10) Patent No.: US 6,233,148 B1
(45) Date of Patent: May 15, 2001

(54) HARD DISK DRIVE HEAT DISSIPATION DEVICE

(76) Inventor: Tsan Jung Shen, 10F No. 21, Alley 169, Kan-Ning St., Si-Che Town, Taipei (TW)

( * ) Notice: Subject to any disclaimer, the term of this patent is extended or adjusted under 35 U.S.C. 154(b) by 0 days.

(21) Appl. No.: 09/400,198

(22) Filed: Sep. 21, 1999

(51) Int. Cl.[7] .................................................. H05K 7/20
(52) U.S. Cl. .................... 361/695; 361/687; 361/692; 361/697; 360/97.02; 454/184; 165/121
(58) Field of Search .................... 361/683, 687, 361/685, 686, 692–697, 699, 689, 690; 360/97.02, 97.01, 97.03, 97.04, 98, 99; 456/186; 55/471, 506, 501, 385.6, 467, 473; 312/223.1, 223.2; 364/708.1; 176/16.1; 340/635, 586; 165/121, 185, 122

(56) References Cited

U.S. PATENT DOCUMENTS

| | | |
|---|---|---|
| 3,912,278 | 10/1975 | Teutsch ................................ 274/1 R |
| 4,642,715 | 2/1987 | Ende ....................................... 360/97 |
| 4,754,397 | 6/1988 | Varaiya et al. ........................ 364/200 |
| 5,171,183 | 12/1992 | Pollard et al. ........................ 454/184 |
| 5,418,775 * | 5/1995 | Okatani ............................... 369/275.5 |
| 5,511,055 | 4/1996 | Otsuki et al. ........................ 369/75.1 |
| 5,514,036 | 5/1996 | Lin ........................................ 454/184 |
| 5,654,846 | 8/1997 | Wicks et al. ........................ 360/97.01 |
| 5,680,295 | 10/1997 | Le et al. ................................ 361/695 |
| 5,694,290 | 12/1997 | Chang ................................... 361/685 |
| 5,844,747 | 12/1998 | Wang ................................... 360/97.02 |
| 5,876,278 | 3/1999 | Cheng .................................... 454/184 |
| 5,886,639 | 3/1999 | Behl et al. ............................ 340/635 |
| 5,927,386 | 7/1999 | Lin ....................................... 165/80.3 |
| 6,069,792 * | 5/2000 | Nelik ..................................... 361/687 |

FOREIGN PATENT DOCUMENTS 411066832   3/1999   (JP) ................................ G11B/33/08

* cited by examiner

*Primary Examiner*—Leo P. Picard
*Assistant Examiner*—Michael Datskovsky
(74) *Attorney, Agent, or Firm*—Dougherty & Troxell

(57) ABSTRACT

A hard disk drive heat dissipation device that dissipates heat generated during the operation of a hard disk drive. The device of the present invention is comprised of a body having a surface area of appropriate dimension. A fan is installed onto the body and a number of heat dissipation holes are formed near the outer edges of the body. When the body is mounted onto a hard disk drive, since the body is flush against the surface of the hard disk drive, the body can be tightly secured to the hard disk drive. As such, when the fan is in a state of rotation, the air flow from the exterior is immediately directed onto the hard disk drive such that the heat generated by the hard disk drive does not accumulate on the hard disk drive surface, but is exhausted out through the heat dissipation holes in the body to thereby enable the rapid cooling of the hard disk drive.

6 Claims, 7 Drawing Sheets

HARD DISK DRIVE HEAT DISSIPATION DEVICE

BACKGROUND OF THE INVENTION

1) Field of the Invention

The invention herein relates to a hard disk drive heat dissipation device, wherein the body of the said device is installed onto the surface of a hard disk drive such that when the hard disk drive is operating, the fan positioned on the body directs cool air inward and the heated air generated is exhausted out through heat dissipation holes to achieve the objective of rapid cooling.

2) Description of the Prior Art

To support processors and software, the unit capacities of current hard disk drives have increased from megabytes to gigabytes and, furthermore, the read-write speeds have become faster and faster. Thus, how to rapidly exhaust the heated air generated by hard disk drives during operation and thereby prevent hard disk drive overheating and operating failure has become another major problem similar to the heat dissipation problems of processors. Since the conventional approach only consists of installing a fan at one end of the hard disk drive, when the fan rotates, the air flow from the exterior is blocked by the end of the hard disk drive, cannot be dispersed over the entire hard disk drive, and fails to reach the front end of the hard disk drive such that most of the heated air generated by the hard disk drive accumulates on the hard disk drive as a result of extremely limited heat dissipation performance.

SUMMARY OF THE INVENTION

To improve upon the various shortcomings of the said conventional device structure, the inventor of the invention herein conducted extensive research and testing which finally culminated in the successful design of the hard disk drive heat dissipation device of the invention herein.

The primary objective of the invention herein is to provide a hard disk drive heat dissipation device in which the body has a surface area of appropriate dimension, a fan is installed onto the body, and a number of heat dissipation holes are formed near the outer edges of the body such that when the body is secured against a hard disk drive, the rotating fan directs an air flow from the exterior onto the hard disk drive and, furthermore, the air flow is dispersed over the entire hard disk drive, and after the heated air generated by the hard disk drive is so driven, it is immediately exhausted out from the heat dissipation holes in the body to enable the rapid cooling of the hard disk drive.

Another objective of the invention herein is to provide a hard disk drive heat dissipation device in which an extension section is installed to each of the two sides of the body to enable users the option of directly mounting the assembled body and hard disk drive into a larger drive bay in a host machine.

Yet another objective of the invention herein is to provide a hard disk drive heat dissipation device in which one or more adjacent hook and tab are formed in the body along the side of the fan space so that the power wires of the fan can be tucked into the hook and situated against the tab and thereby neatly routed laterally next to the fan rather than being laid on the body in a disorderly state.

To enable a further understanding of the objectives, profile, structure, device innovations, and other functions of the invention herein, the brief description of the drawings below are followed by the detailed description of the preferred embodiments.

DETAILED DESCRIPTION OF THE PREFERRED EMBODIMENTS

Figure 1:
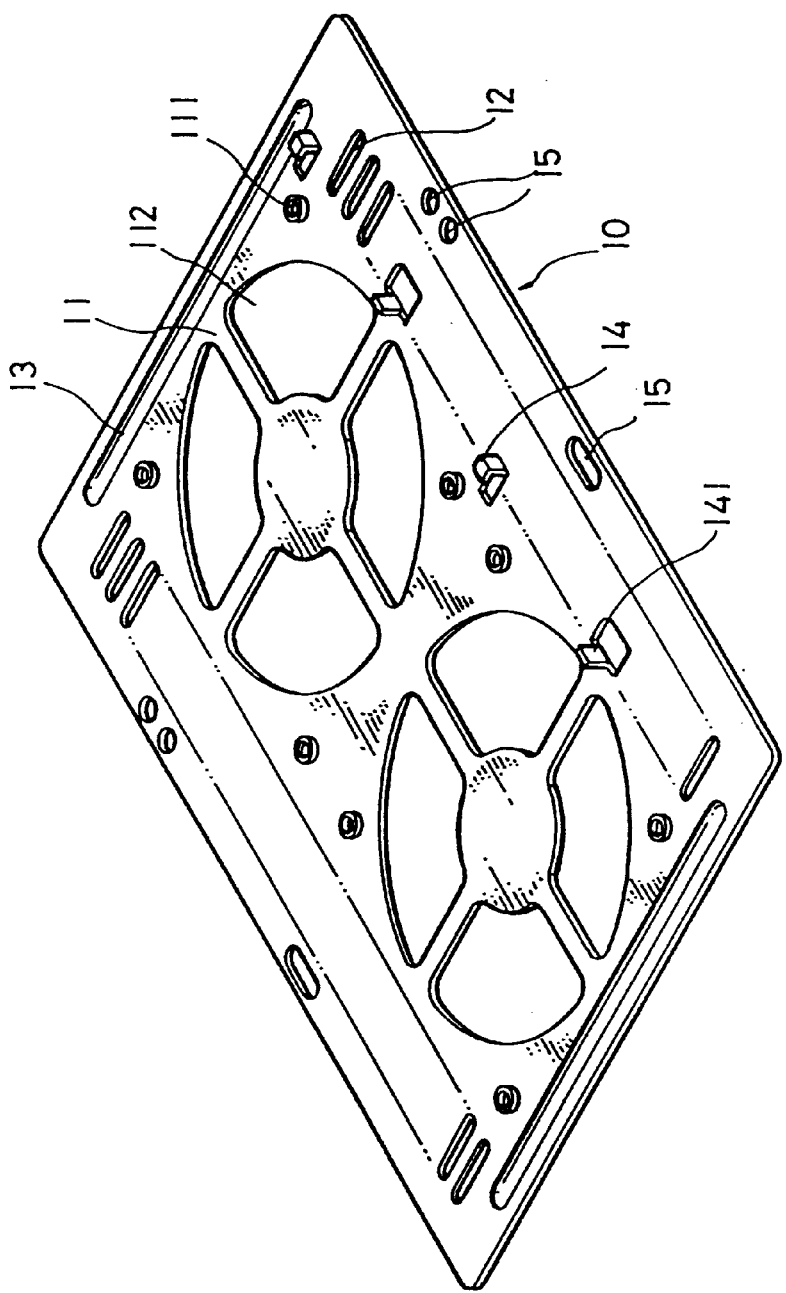
FIG. 1 is an isometric drawing of an embodiment of the invention herein.
Figure 2:
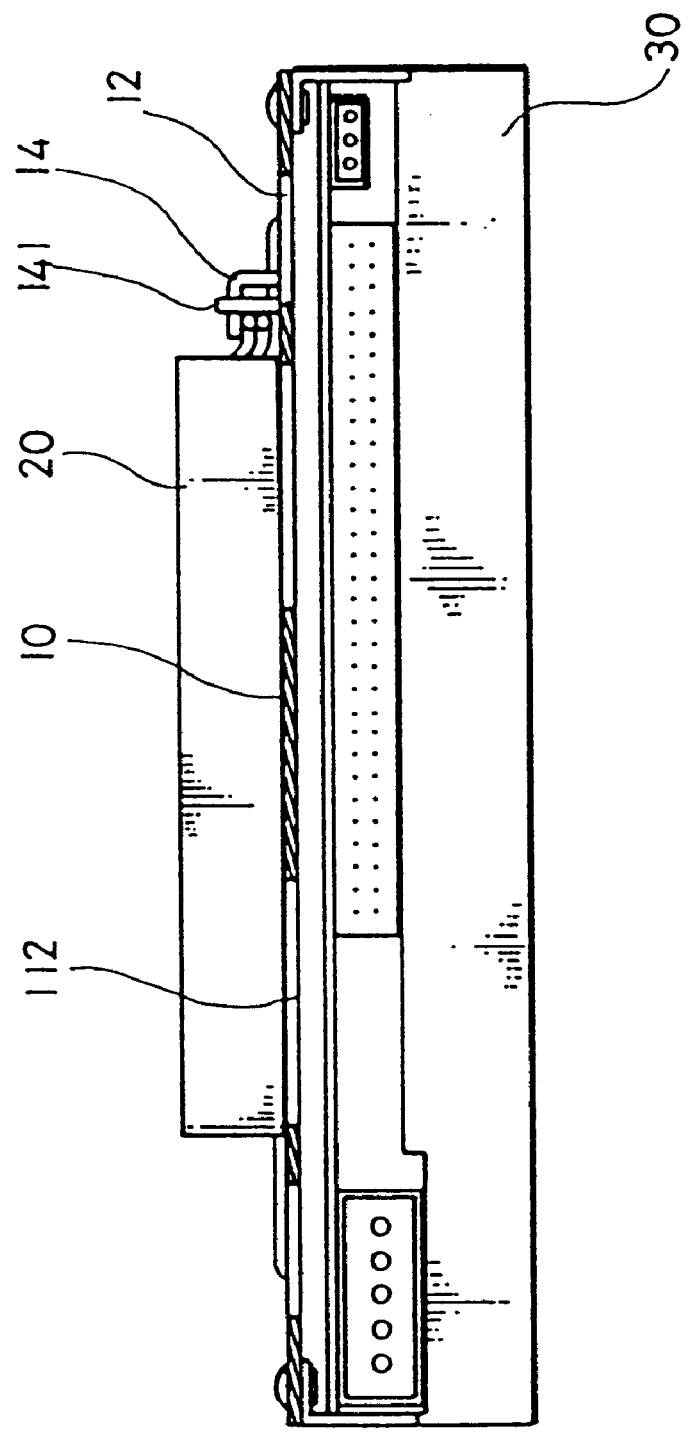
FIG. 2 is an orthographic drawing of an embodiment of the invention herein as installed on a hard disk drive.

The invention herein is a hard disk drive heat dissipation device that dissipates heat generated by a hard disk drive; referring to FIG. 1, an embodiment of the invention herein, the said device is comprised of a body 10 which in the said embodiment is a pressed metal plate; a minimum of one space 11 is allotted in the said body 1 for the placement of a fan 20 and there are one or more mounting posts 111 disposed along each side of the said space 11 and, furthermore, openings 112 (as indicated in FIG. 2) that correspond to the fan 20 are sheared in the said space 11; additionally, one or more heat dissipation holes 12 are cut near the outer edges of the said body 10 and, furthermore, a minimum of one projecting rib 13 is appropriately disposed on the said body 10 that serves to structurally reinforce the body 10; in addition, a minimum of one adjacent hook 14 and tab 141 are formed in the body 10 along the side of the space 11 so that the power wires of the fan 20 can be tucked into the hook 14 and situated against the tab 14 and thereby neatly routed laterally next to the fan 20; one face of the fan 20 extends away from the body 10 and, furthermore, a minimum of one mounting hole 15 is formed at the lateral periphery of the said body 10.

Referring to FIG. 2, when the said embodiment is assembled, the fan 20 is first installed into the space 11 of the body 10 and then screw fasteners are inserted into the fan 20 and tightened into the mounting posts 111 (indicated in FIG. 1) on the body 10; after the fan 20 is mounted onto the body 10, screw fasteners are inserted into the mounting holes 15 and tightened into the hard disk drive 30, enabling the installation of the body 10 to the surface of the hard disk drive 30 and as such, when the fan 20 rotates, air flows from the exterior through the body 10 openings 11 and in between the body 10 and the hard disk drive 30 such that the heat generated by the operation of the hard disk drive 30 is forced from two sides and then rapidly exhausted out of the heat dissipation holes 12, thereby enabling the rapid cooling of the hard disk drive 30.

Figure 3:
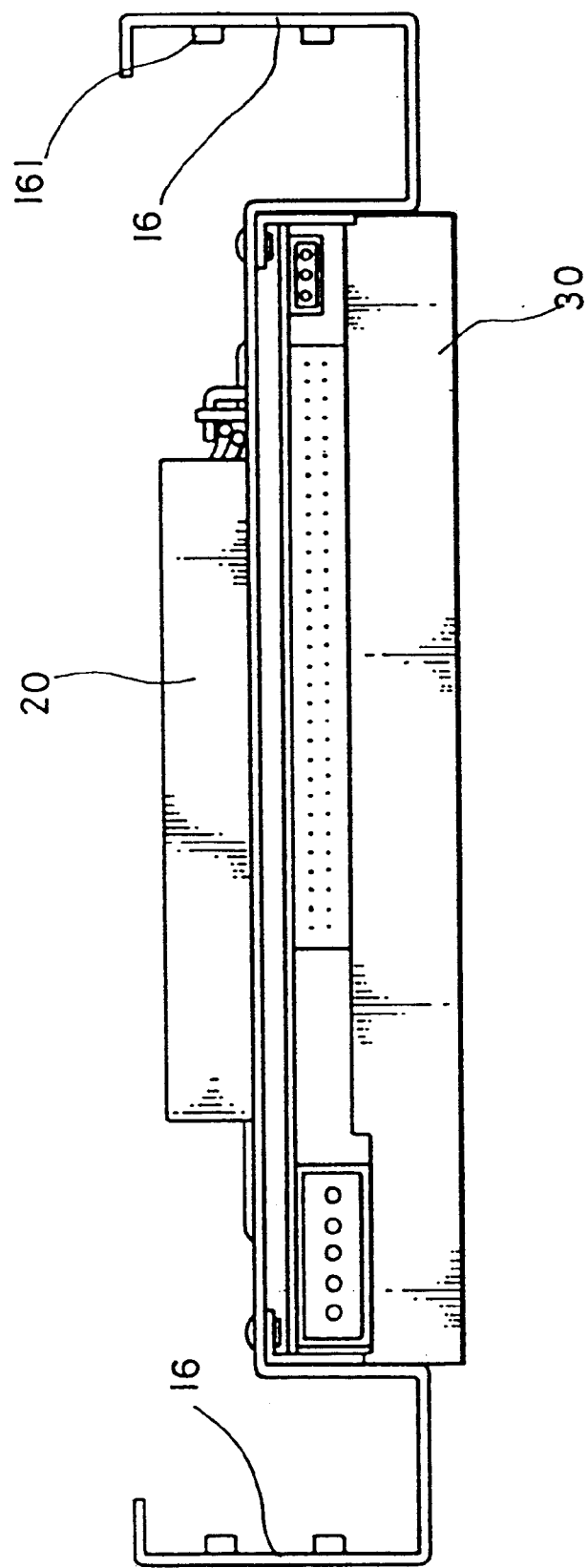
FIG. 3 is an orthographic drawing of another embodiment of the invention herein.

Referring to FIG. 3, an extension section 16 projecting outward and having a certain width is installed to each of the two sides of the said body 10 and a minimum of one through-hole 161 is formed in the extension section 16 to enable users the option of mounting the assembled body 10 and hard disk drive 30 (3.5-inch) into a larger drive bay (5.25-inch) of a host machine, wherein the extension sections 16 at the two sides of the said body 10 are fitted into the drive bay and then screw fasteners are inserted in the through-holes 161 to mount the body 10 in the drive bay (not shown in the drawings), thereby enabling the direct installation of the hard disk drive 30 into a larger drive bay without required additional components.

Figure 4:
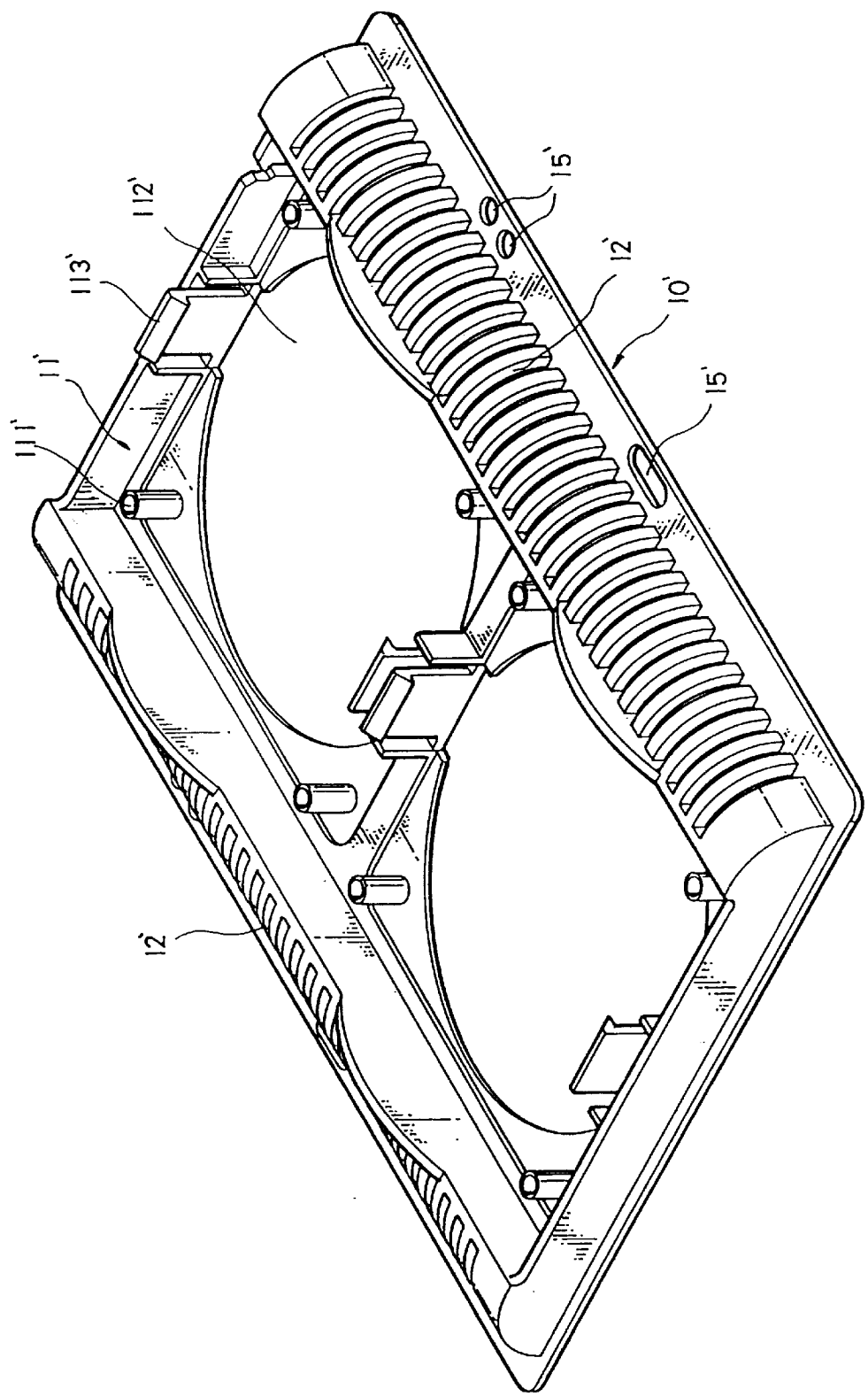
FIG. 4 is an isometric drawing of another embodiment of the invention herein.

Referring to FIG. 4, another embodiment of the invention herein, the said device is comprised of a body 10' which in the said embodiment is a one-piece injection molded frame; a minimum of one recess 11' is formed in the body 10' to accommodate a fan 20 and there are one or more mounting posts 111' disposed along each side of the said recess 11' and, furthermore, openings 112' that correspond to the fan 20 are formed in the said recess 11'; additionally, an insertion catch 113' is disposed on each of the opposite two sides of the said recess 11' and, furthermore, one or more heat dissipation holes 12' are formed near the outer edges of the said body 10'; the said embodiment has a series of evenly arrayed and, furthermore, arc-shaped slot holes and, furthermore, a minimum of one mounting hole 15' is formed at the lateral periphery of the said body 10'.

Figure 5:
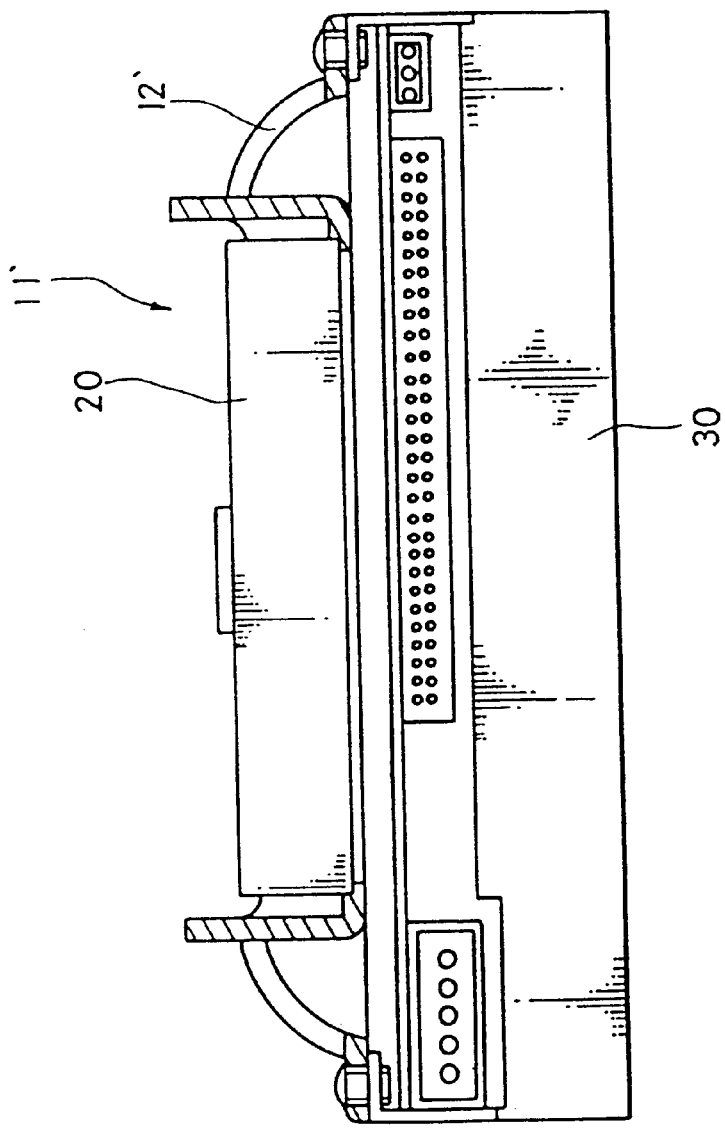
FIG. 5 is an orthographic drawing of another embodiment of the invention herein as installed on a hard disk drive.

Referring to FIG. 4 and FIG. 5, when the said embodiment is assembled, the fan 20 is first installed into the recess 11' of the body 10' and then the insertion catches 113' (indicated in FIG. 1) are latched over the fan 20 and after the fan 20 is positioned on the body 10', screw fasteners are inserted into the mounting holes 15' and tightened into the hard disk drive 30, enabling the installation of the body 10' to the surface of the hard disk drive 30 and as such, when the fan 20 rotates, air flows from the exterior through the body 10' openings 112' and in between the body 10' and the hard disk drive 30 such that the heat generated by the operation of the hard disk drive 30 is forced from two sides and then rapidly exhausted out of the heat dissipation holes 12', thereby enabling the rapid cooling of the hard disk drive 30.

Figure 6:
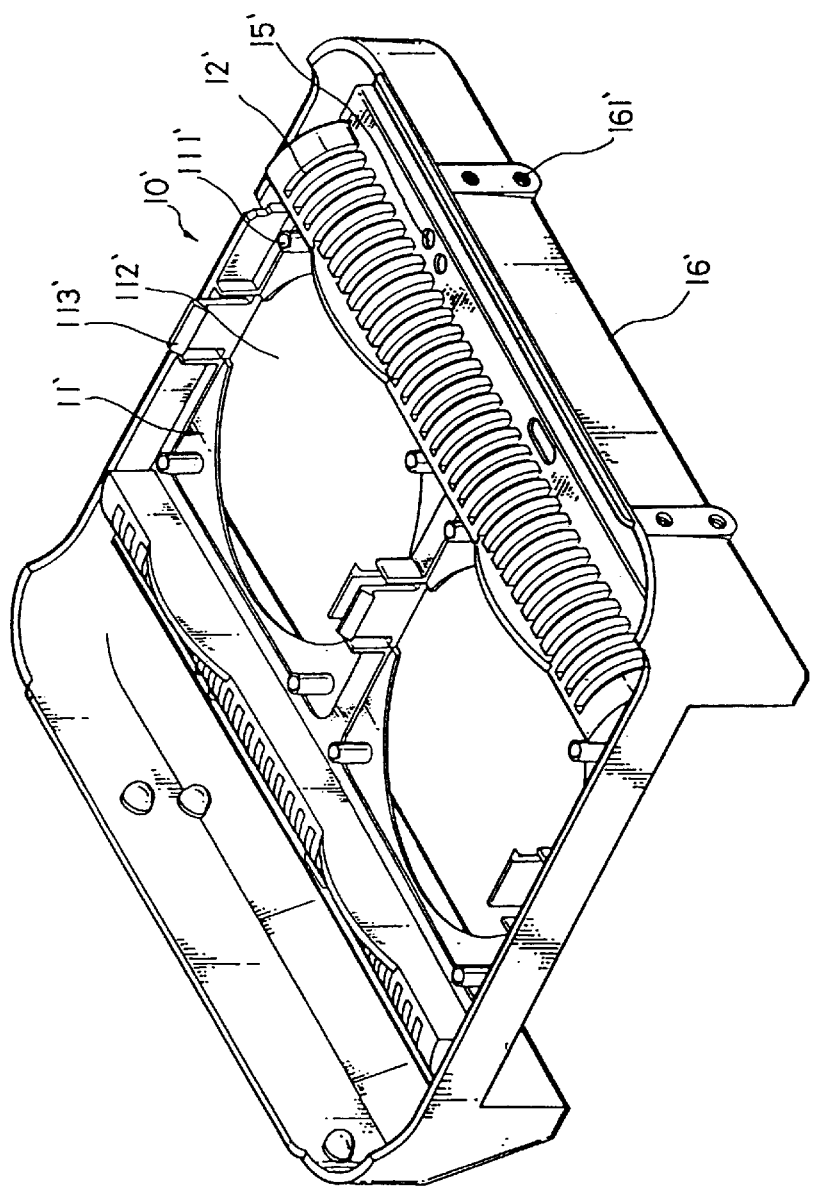
FIG. 6 is an isometric drawing of an embodiment of the invention herein.
Figure 7:
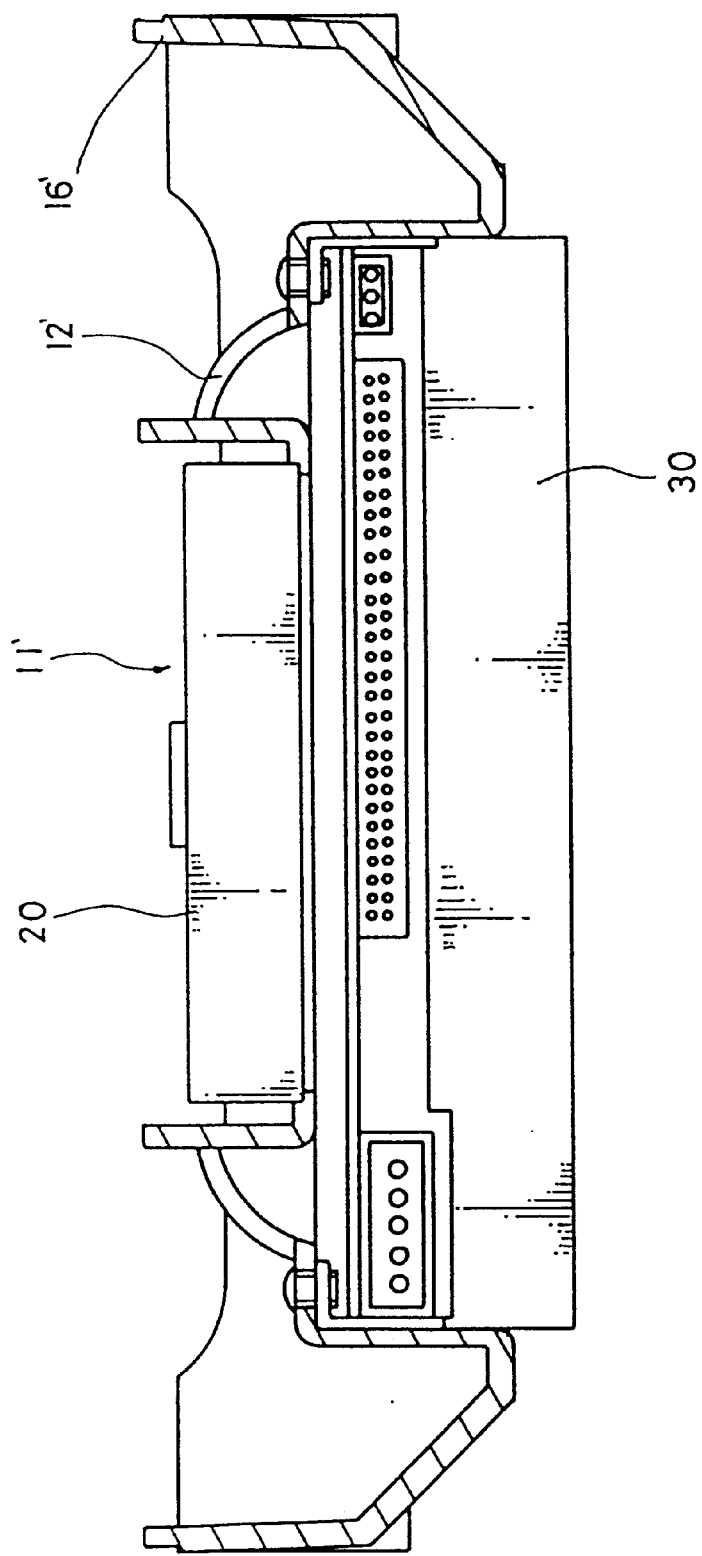
FIG. 7 is an orthographic drawing of an embodiment of the invention herein as installed on a hard disk drive.

Referring to FIG. 6 and FIG. 7, an extension section 16' projecting outward and having a certain width as projecting is installed to each of the two sides of the said body 10' and a minimum of one through-hole 161' is formed in the extension section 16' to enable users the option of mounting the assembled body 10' and hard disk drive 30 (3.5-inch) into a larger drive bay (5.25-inch) of a host machine, wherein the extension sections 16' at the two sides of the said body 10' are fitted into the drive bay and then screw fasteners are inserted in the through-holes 161' to secure the body 10' to the drive bay (not shown in the drawings), thereby enabling the direct mounting of the hard disk drive 30 into a larger drive bay without requiring additional components.

In summation of the foregoing section, the invention herein is functionally more practical and progressive than conventional products and, furthermore, a similar structure or device was never observed in public utilization or periodicals prior to the patent application submittal of the innovative structure and profile of the present invention which is, therefore, an original invention. In accordance with Article 97 of the Patent Law, the inventor of the invention herein files an application with the Patent Bureau for review and the granting of the commensurate patent rights.

The said embodiments of the invention herein only serve as examples in the detailed description, and all modifications and adaptations of the embodiments based on the disclosure by persons skilled in the technology remain within the protected scope of the spirit and claims of the invention herein.

What is claimed is:

1. A hard disk drive heat dissipation device comprising:
    a hard disk drive having a top surface:
    a body having a surface area, with a plurality of heat dissipation holes in outer edges of the body; and
    at least one fan installed on the body,
    wherein the body is installed flush against the top surface of the hard disk drive, and tightly secured thereto such that when the at least one fan is in a state of rotation, air flow from an exterior is immediately directed onto the hard disk drive such that the heat generated by the hard disk drive does not accumulate on the hard disk drive, but is exhausted out through the plurality of heat dissipation holes in the body to thereby enable the rapid cooling of the hard disk drive.

2. The hard disk drive heat dissipation device of claim 1, further comprising mounting posts disposed along an outer periphery of a space on the said body allotted for the placement of the said fan, and screw fasteners inserted into the fan and tightened into the mounting posts to be thereby installed on the body.

3. The hard disk drive heat dissipation device of claim 1, further comprising an insertion catch disposed on each of two opposite sides of a recess allotted for the placement of the said fan, enabling the fan to be latched down by said insertion catches and positioned on the body.

4. The hard disk drive heat dissipation device of claim 1, further comprising at least one adjacent hook and tab formed in the body along a side of a fan space so that power wires of the fan can be tucked into the said hook and situated against the tab and thereby be neatly routed laterally next to the fan rather than laid on the body in a disorderly state.

5. The hard disk drive heat dissipation device of claim 1, further comprising an extension section installed on each of two sides of the body to enable users the option of mounting the assembled body and hard disk drive into a larger drive bay.

6. The hard disk drive heat dissipation device of claim 1 further comprising at least one mounting hole formed in a lateral periphery of the body, enabling screw fasteners to be inserted into the at least one mounting hole and tightened into the hard disk drive to thereby install the body onto the hard disk drive.

* * * * *